W. MUSGROVE.
Improvement in Dust-Pans.
No. 132,367. Patented Oct. 22, 1872.
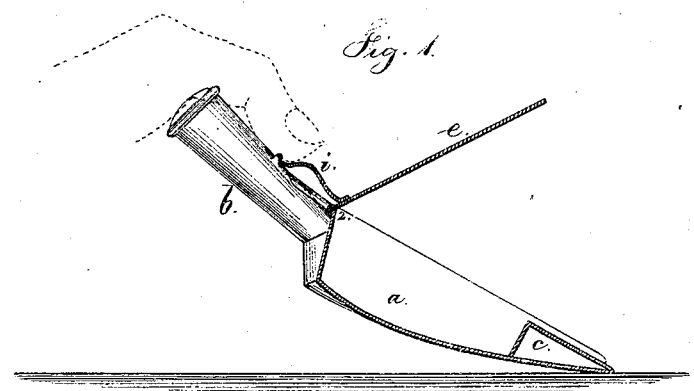
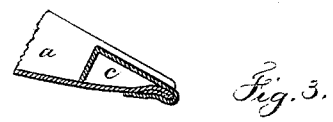
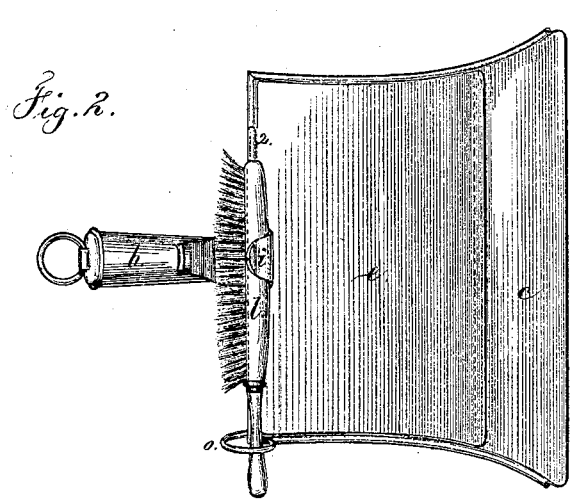
Witnesses,
Chas. H. Smith
Geo. T. Pinckney
Inventor,
William Musgrove,
Lemuel W. Serrell
atty.

UNITED STATES PATENT OFFICE.

WILLIAM MUSGROVE, OF NEW YORK, N. Y.

IMPROVEMENT IN DUST-PANS.

Specification forming part of Letters Patent No. 132,367, dated October 22, 1872; antedated October 19, 1872.

*To all whom it may concern:*

Be it known that I, WILLIAM MUSGROVE, of the city and State of New York, have invented an Improvement in Dust-Pans, and the following is declared to be a correct description thereof.

Dust-pans have been made with a cover that turns entirely back when in use, or closes down upon the contents. This cover is inconvenient when holding the dust-pan, and is only serviceable as a cover.

My invention consists in a dust-pan with a cover provided with a stop and thumb-piece, which prevents the cover being opened too far, and enables the user to hold the cover open when in use by pressure from the thumb or finger, and said cover acts as a deflector to prevent the pieces that are swept up being thrown entirely over the dust-pan, and the said cover is not in the way when grasping the handle. The said thumb-piece also acts as a holder for a brush, either alone or combined with a loop upon the dust-pan or its cover.

In the drawing, Figure 1 is a section of the dust-pan with the cover open, and Fig. 2 is a plan of the same closed, and with a brush in position on said thumb-piece.

The pan $a$ is made with the handle $b$, as usual, and with a ledge, $c$, over which dust, crumbs, or pieces are to be swept, and I remark that the pan and handle are to be of any desired size and configuration. The sheets of metal of the ledge $c$ and pan $a$ are stiffened at the edge by double seaming, as shown in Fig. 3. The cover $e$ is hinged to the upper edge of the pan $a$ at 2, and is of a size to fit said pan and extend to the ledge $c$. The thumb-piece $i$ upon the cover $e$ forms a stop when the cover is open, as seen in Fig. 1, and when the cover is closed it forms a holder for a brush, $l$, as in Fig. 2. This brush rests in this holder $i$ and in a loop or ring, $o$, attached either upon the cover or the edge of the pan, for receiving the handle of the brush.

The edge of the dust-pan, made as aforesaid, is much stronger than those heretofore constructed of a sheet of metal simply bent over.

I claim as my invention—

The dust-pan made with a hinged cover and thumb-piece that forms a stop and also a brush-holder, and with a loop, $o$, the parts being constructed and combined as set forth and shown.

Signed by me this 16th day of March, A. D. 1872.

WM. MUSGROVE.

Witnesses:
 GEO. T. PINCKNEY,
 CHAS. H. SMITH.